US010491343B2

(12) United States Patent
Rico Alvarino et al.

(10) Patent No.: US 10,491,343 B2
(45) Date of Patent: Nov. 26, 2019

(54) SIMULTANEOUS NARROWBAND TRANSMISSION/RECEPTION IN ENHANCED MACHINE TYPE COMMUNICATIONS

(71) Applicant: QUALCOMM Incorporated, San Diego, CA (US)

(72) Inventors: Alberto Rico Alvarino, San Diego, CA (US); Hao Xu, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 15/094,334

(22) Filed: Apr. 8, 2016

(65) Prior Publication Data

US 2016/0301503 A1 Oct. 13, 2016

Related U.S. Application Data

(60) Provisional application No. 62/146,137, filed on Apr. 10, 2015.

(51) Int. Cl.
*H04L 5/00* (2006.01)
*H04B 1/713* (2011.01)
(Continued)

(52) U.S. Cl.
CPC ........... *H04L 5/0012* (2013.01); *H04B 1/713* (2013.01); *H04L 5/0053* (2013.01); *H04W 4/70* (2018.02);
(Continued)

(58) Field of Classification Search
USPC .......................................................... 370/329
See application file for complete search history.

(56) References Cited

U.S. PATENT DOCUMENTS 9,113,465 B2 * 8/2015 Lee ................... H04W 72/0446
9,585,122 B2 * 2/2017 Morioka .............. H04L 1/1861
(Continued)

FOREIGN PATENT DOCUMENTS

WO WO-2014022165 A1 2/2014

OTHER PUBLICATIONS

Huawei et al., "Supporting FDM for MTC UEs and other UEs," 3GPP Draft; R1-150400, 3rd Generation Partnership Project (3GPP), Mobile Competence Centre ; 650, Route Des Lucioles ; F-06921 Sophia-Antipolis Cedex ; France , vol. RAN WG1, No. Athens, Greece; Feb. 9, 2015-Feb. 13, 2015 Feb. 8, 2015 (Feb. 8, 2015), XP050933609, Retrieved from the Internet: URL:http://www.3gpp.org/ftp/Meetings_3GPP_SYNC/RAN1/Docs/ [retrieved on Feb. 8, 2015], 4 pages.

(Continued)

*Primary Examiner* — Edan Orgad
*Assistant Examiner* — Emmanuel K Maglo
(74) *Attorney, Agent, or Firm* — Qualcomm Incorporated/Patterson & Sheridan, L.L.P.

(57) ABSTRACT

Certain aspects of the present disclosure generally relate to wireless communications, and more specifically to narrowband retuning for simultaneous transmission and reception (e.g., broadcast-broadcast or broadcast-unicast) in enhanced machine type communications (eMTC). An example method that can be performed by a base station (BS) generally includes transmitting a first type of signal in a first set of narrowband resources for a first duration and transmitting a second type of signal in a second set of narrowband resources for a second duration. A user equipment (UE) can monitoring for the first type of signal in the first set of narrowband resources for the first duration and tune-away to the second set of narrowband resources to monitor for the second type of signal for the second duration.

26 Claims, 15 Drawing Sheets

(51) Int. Cl.

| | |
|---|---|
| ***H04W 24/08*** | (2009.01) |
| ***H04W 36/16*** | (2009.01) |
| ***H04W 36/36*** | (2009.01) |
| ***H04W 68/00*** | (2009.01) |
| ***H04W 4/70*** | (2018.01) |
| ***H04W 76/28*** | (2018.01) |
| *H04L 5/14* | (2006.01) |
| *H04W 74/08* | (2009.01) |

(52) U.S. Cl.

CPC ........... *H04W 24/08* (2013.01); *H04W 36/16* (2013.01); *H04W 36/36* (2013.01); *H04W 68/005* (2013.01); *H04W 76/28* (2018.02); *H04L 5/14* (2013.01); *H04W 74/0833* (2013.01)

(56) References Cited

U.S. PATENT DOCUMENTS 9,820,247 B2* 11/2017 Xiong .................... H04W 4/70
9,839,009 B2 12/2017 Chen et al.
2009/0225722 A1* 9/2009 Cudak .................. H04L 5/0007 370/330
2011/0310856 A1* 12/2011 Hariharan ............ H04L 1/1607 370/336
2013/0028126 A1* 1/2013 Kazmi ................. H04W 24/10 370/252
2013/0090115 A1* 4/2013 Deivasigamani ..... H04W 48/20 455/434
2013/0100900 A1* 4/2013 Lee ........................ H04W 4/70 370/329
2013/0176952 A1* 7/2013 Shin ....................... H04L 5/001 370/329
2013/0195043 A1* 8/2013 Chen .................... H04W 72/04 370/329
2013/0308465 A1* 11/2013 Xu ....................... H04W 76/28 370/241
2014/0031031 A1* 1/2014 Gauvreau ............ H04L 5/0053 455/426.1
2014/0146738 A1* 5/2014 Morioka .............. H04L 1/1861 370/312
2015/0043455 A1* 2/2015 Miklos ................... H04W 8/26 370/329
2015/0078329 A1* 3/2015 Zhu ...................... H04L 5/0005 370/330
2015/0257173 A1* 9/2015 You ...................... H04L 1/1864 370/330
2015/0271870 A1* 9/2015 Agiwal ................ H04W 76/14 370/311
2015/0333880 A1* 11/2015 Yi .......................... H04L 5/001 370/329
2016/0081101 A1* 3/2016 Yu .................... H04W 52/0258 370/329
2016/0127918 A1* 5/2016 Yi ....................... H04W 84/047 370/329
2016/0142308 A1* 5/2016 Gage ...................... H04W 4/70 370/392
2016/0234707 A1* 8/2016 Kazmi ................... H04W 4/70
2016/0301503 A1* 10/2016 Rico Alvarino ....... H04B 1/713

OTHER PUBLICATIONS

International Search Report and Written Opinion—PCT/US2016/026845—ISA/EPO—dated Jun. 22, 2016.

Mediatek Inc: "Simultaneously Reception of Unicast and Broadcast for Rel-13 MTC UE," 3GPP Draft; R1-150678 Simultaneously Reception of Broadcast and Unicast for REL-13 MTC UE, 3rd Generation Partnership Project (3GPP), Mobile Competence Centre ; 650, Route Des Lucioles ; F-06921 SOPHI vol. RAN WG1, No. Athens, Greece; Feb. 9, 2015-Feb. 13, 2015 Feb. 8, 2015 (Feb. 8, 2015), XP050933878, Retrieved from the Internet: URL:http://www.3gpp.org/ftp/Meetings_3GPP_SYNC/RAN1/Docs/ [retrieved on Feb. 8, 2015], 4 pages.

Nokia Networks et al., "Simultaneous Reception of Unicast and Broadcast for MTC UE," 3GPP Draft; R1-150264, 3rd Generation Partnership Project (3GPP), Mobile Competence Centre ; 650, Route Des Lucioles ; F-06921 Sophia-Antipolis Cedex ; France 9 vol. RAN WG1, No. Athens, Greece; Feb. 9, 2015-Feb. 13, 2015 Feb. 8, 2015 (Feb. 8, 2015), XP050933476, Retrieved from the Internet: URL:http://www.3gpp.org/ftp/Meetings_3GPP_SYNC/RAN1/Docs/ [retrieved on Feb. 2015].

Qualcomm Incorporated : "Physical Data Channels," 3GPP Draft; R1-150464 Physical Data Channels, 3rd Generation Partnership Project (3GPP), Mobile Competence Centre ; 650, Route Des Lucioles ; F-06921 Sophia-Antipolis Cedex ; France vol. RAN WG1, No. Athens, Greece; Feb. 9, 2015-Feb. 13, 2015 Feb. 8, 2015 (Feb. 8, 2015), XP050933672, Retrieved from the Internet: URL:http://www.3gpp.org/ftp/Meetings_3GPP_SYNC/RAN1/Docs/ [retrieved on Feb. 8, 2015].

NEC: "Frequency Hopping Schemes for LTE Rel-13 MTC," 3GPP Draft; R1-150286 Frequency Hopping Design for LIE REL-13 MTC-CLN, 3rd Generation Partnership Project (3GPP), Mobile Competence Centre ; 650, Route Des Lucioles ; F-06921 Sophia-Antipolis Cedex vol. RAN WG1, No. Athens, Greece; Feb. 9, 2015-Feb. 13, 2015 Feb. 8, 2015 (Feb. 8, 2015), XP050933496, Retrieved from the Internet: URL:http://www.3gpp.org/ftp/Meetings_3GPP_SYNC/RAN1/Docs/ [retrieved on Feb. 8, 2015], 4 pages.

* cited by examiner

SIMULTANEOUS NARROWBAND TRANSMISSION/RECEPTION IN ENHANCED MACHINE TYPE COMMUNICATIONS

CROSS-REFERENCE TO RELATED APPLICATION & PRIORITY CLAIM

This application claims benefit of and priority to U.S. Provisional Patent Application Ser. No. 62/146,137, filed Apr. 10, 2015, which is herein incorporated by reference in its entirety for all applicable purposes.

BACKGROUND

Field of the Disclosure

Certain aspects of the present disclosure generally relate to wireless communications, and more specifically to simultaneous narrowband transmission/reception (e.g., broadcast-broadcast or broadcast-unicast) in enhanced machine type communications (eMTC).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, monitors, location tags, drones, trackers, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for simultaneous narrowband transmission/reception (e.g., broadcast-broadcast or broadcast-unicast) in enhanced machine type communications (eMTC).

Certain aspects of the present disclosure provide a method for wireless communications by a base station (BS). The method generally includes transmitting a first type of signal in a first set of narrowband resources for a first duration and transmitting a second type of signal in a second set of narrowband resources for a second duration.

Certain aspects of the present disclosure provide an apparatus for wireless communications by a BS. The apparatus generally includes means for transmitting a first type of signal in a first set of narrowband resources for a first duration and means for transmitting a second type of signal in a second set of narrowband resources for a second duration.

Certain aspects of the present disclosure provide an apparatus for wireless communications by a BS. The apparatus generally includes at least one processor configured to transmit a first type of signal in a first set of narrowband resources for a first duration and transmit a second type of signal in a second set of narrowband resources for a second duration; and a memory coupled with the at least one processor.

Certain aspects of the present disclosure provide a computer readable medium having computer executable code stored thereon. The computer executable code generally includes code for transmitting a first type of signal in a first set of narrowband resources for a first duration and code for transmitting a second type of signal in a second set of narrowband resources for a second duration.

Certain aspects of the present disclosure provide a method for wireless communications by a user equipment (UE). The method generally includes monitoring for a first type of signal in a first set of narrowband resources for a first duration and tuning-away, to a second set of narrowband resources, to monitor for a second type of signal for a second duration.

Certain aspects of the present disclosure provide an apparatus for wireless communications by a UE. The apparatus generally includes means for monitoring for a first type of signal in a first set of narrowband resources for a first duration and means for tuning-away, to a second set of narrowband resources, to monitor for a second type of signal for a second duration.

Certain aspects of the present disclosure provide an apparatus for wireless communications by a UE. The apparatus generally includes at least one processor configured to monitor for a first type of signal in a first set of narrowband resources for a first duration and tune-away, to a second set of narrowband resources, to monitor for a second type of signal for a second duration; and a memory coupled with the at least one processor.

Certain aspects of the present disclosure provide a computer readable medium having computer executable code stored thereon. The computer executable code generally includes code for monitoring for a first type of signal in a first set of narrowband resources for a first duration and code for tuning-away, to a second set of narrowband resources, to monitor for a second type of signal for a second duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other embodiments without specific recitation.

DETAILED DESCRIPTION

Figure 1:
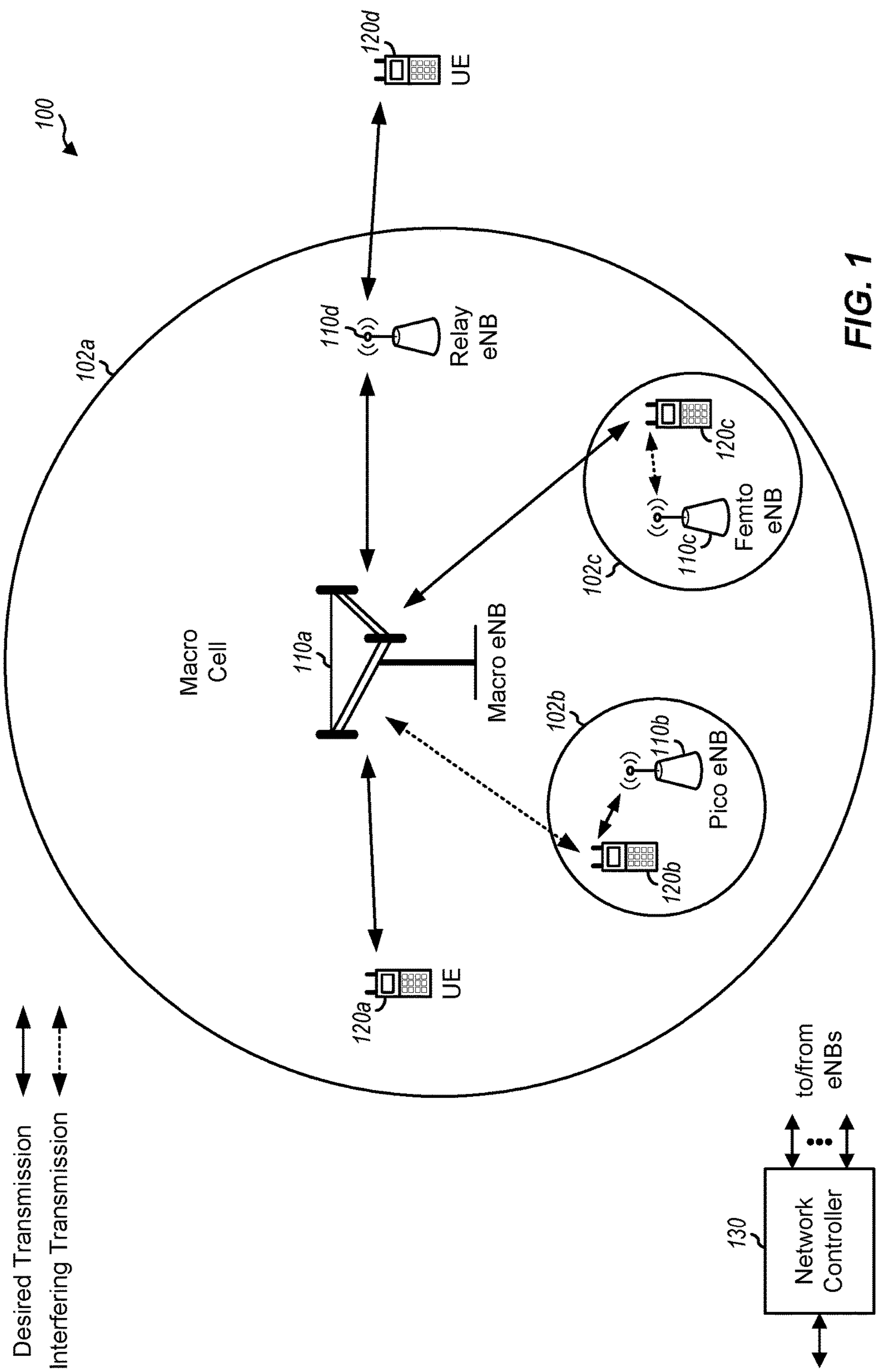
FIG. 1 is a block diagram conceptually illustrating an example wireless communication network, in accordance with certain aspects of the present disclosure.

In narrowband operations (e.g., such as in enhanced machine type communications (eMTC)), simultaneous transmission/reception of signals can help to reduce overhead. For example, aspects of the present disclosure provide techniques and apparatus for narrowband retuning for simultaneous transmission/reception (e.g., broadcast-broadcast or broadcast-unicast) in enhanced machine type communications (eMTC). As will be described in more detail below, the techniques presented herein may allow devices in eMTC to monitor for a first type of signal in a first set of narrowband resources for a first duration and tune-away, to a second set of narrowband resources, to monitor for a second type of signal for a second duration. Similarly, a transmitting device transmits the first type of signal using the first set of narrowband resources and the second type of signal using the second set of narrowband resources. Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

It is noted that while aspects may be described herein using terminology commonly associated with 3G and/or 4G wireless technologies, aspects of the present disclosure can be applied in other generation-based communication systems, such as 5G and later.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, smart ring, smart clothing), etc. Some UEs may be considered machine-type communication (MTC) UEs, which may include remote devices, such as drones, robots, sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Devices may include internet-of-things (IoT) things devices.

Devices that operate in MTC and/or eMTC may be devices with limited communication resources, such as low cost (LC) MTC devices, LC eMTC devices, etc. The LC MTC devices may co-exist with other legacy devices in a particular radio access technology (RAT) (e.g., LTE) and may operate on one or more narrowband regions partitioned out of an available system bandwidth that is supported by the particular RAT (e.g., LTE). The LC MTC devices may also support different modes of operation, such as a coverage enhanced mode (e.g., where repetitions of the same message may be transmitted across multiple subframes), a normal coverage mode (e.g., where repetitions may not be transmitted), etc.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

An Example Wireless Communication System

FIG. 1 illustrates an example wireless communication network 100 with base stations (BSs) and user equipments (UEs), in which aspects of the present disclosure may be practiced. For example, one or more UEs (e.g., LC MTC UEs, LC eMTC UEs, etc.) in the wireless communication network 100 may monitor for a first type of signal (e.g., a broadcast or unicast signal) in a first set of narrowband resources for a first duration and tune-away, to a second set of narrowband resources, to monitor for a second type of signal (e.g., another broadcast or unicast signal) for a second duration. Similarly, an eNB 110 can transmit the first type of signal using the first set of narrowband resources and transmit the second type of signal using the second set of narrowband resources.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110*a* may be a macro eNB for a macro cell 102*a*, an eNB 110*b* may be a pico eNB for a pico cell 102*b*, and an eNB 110*c* may be a femto eNB for a femto cell 102*c*. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110*d* may communicate with macro eNB 110*a* and a UE 120*d* in order to facilitate communication between eNB 110*a* and UE 120*d*. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120*a*, 120*b*, 120*c*) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

One or more UEs 120 in the wireless communication network 100 (e.g., an LTE network) may also be low cost (LC), low data rate devices, e.g., such as LC MTC UEs, that are configured to operate in a narrow bandwidth. The low cost UEs may co-exist with legacy and/or advanced UEs in the LTE network (e.g., capable of operating on a wider bandwidth) and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

In some cases, the narrowband UEs (e.g., in LTE Rel-12) may also be able to monitor downlink (DL) control channels in the same away as legacy and/or advanced UEs in the LTE network monitor DL control channels. Narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc. In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

As mentioned above, one or more UEs 120 in the wireless communication system may use a random access procedure to initiate communications with a BS 110. The random access procedure, in general, may be used in various situations, such as initial access from a disconnected state or radio failure, handover requiring a random access procedure, downlink or uplink data arrival during a connected state after which the UE 120 has lost synchronization, uplink data arrival where there are no dedicated scheduling request channels available and/or other various situations. Examples of the random access procedure may include contention based random access procedures, which may be initiated on a random access channel (RACH), and contention-free (e.g., non-contention based) random access procedures.

Figure 2:
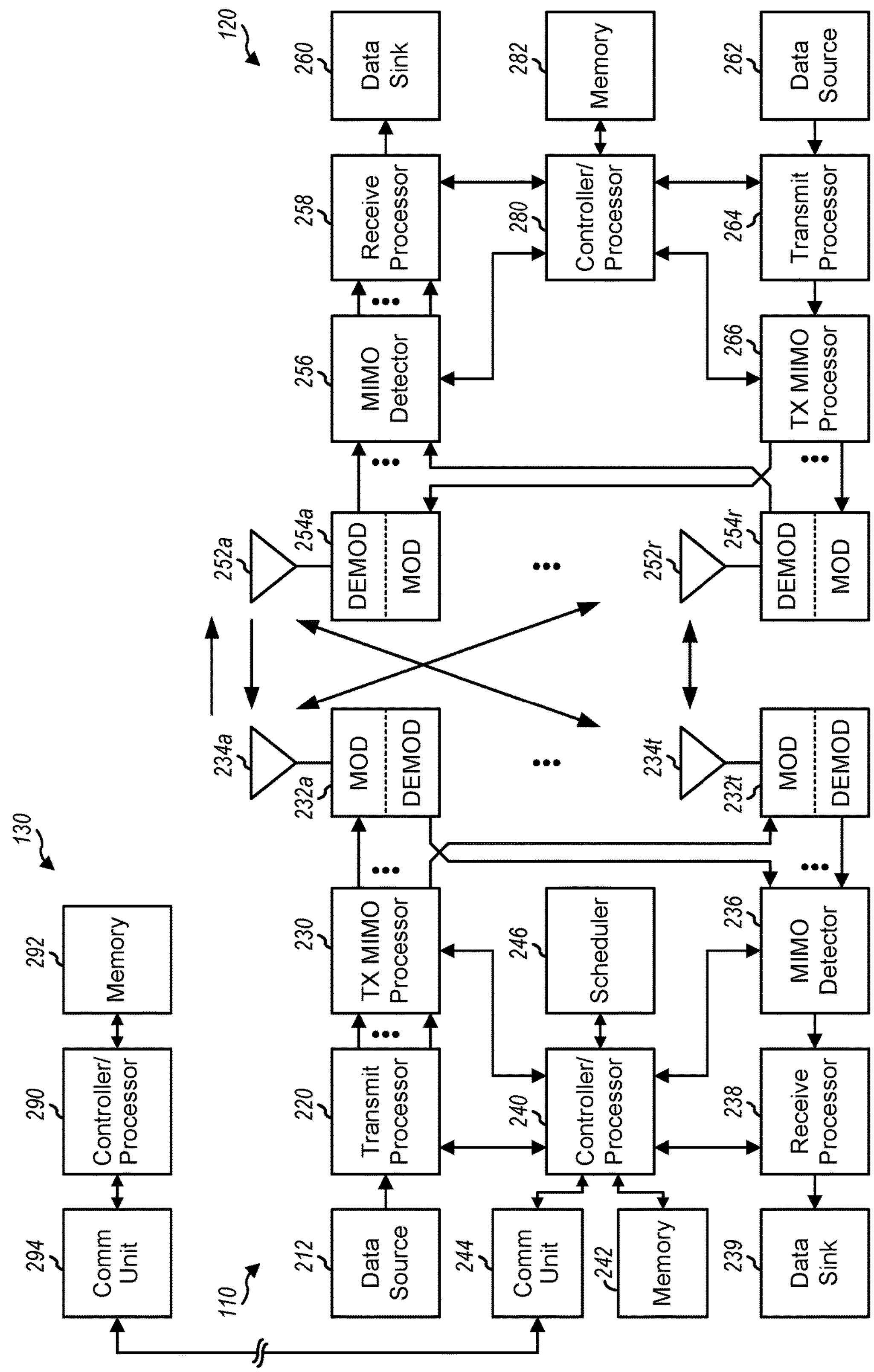
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234*a* through 234*t*, and UE 120 may be equipped with R antennas 252*a* through 252*r*, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from BS 110 and/or other BSs and may provide received signals to demodulators (DEMODs) 254*a* through 254*r*, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254*a* through 254*r* (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operations at BS 110 and UE 120, respectively. For example, controller/processor 240 and/or other processors and modules at BS 110 may perform or direct operations 600 illustrated in FIG. 6 and/or other processes for the techniques described herein. Similarly, controller/processor 280 and/or other processors and modules at UE 120 may perform or direct operations 700 illustrated in FIG. 7 and/or processes for the techniques described herein. Memories 242 and 282 may store data and program codes for BS 110 and UE 120, respectively. A scheduler 246 may schedule UEs for data transmission on the downlink and/or uplink.

Figure 3:
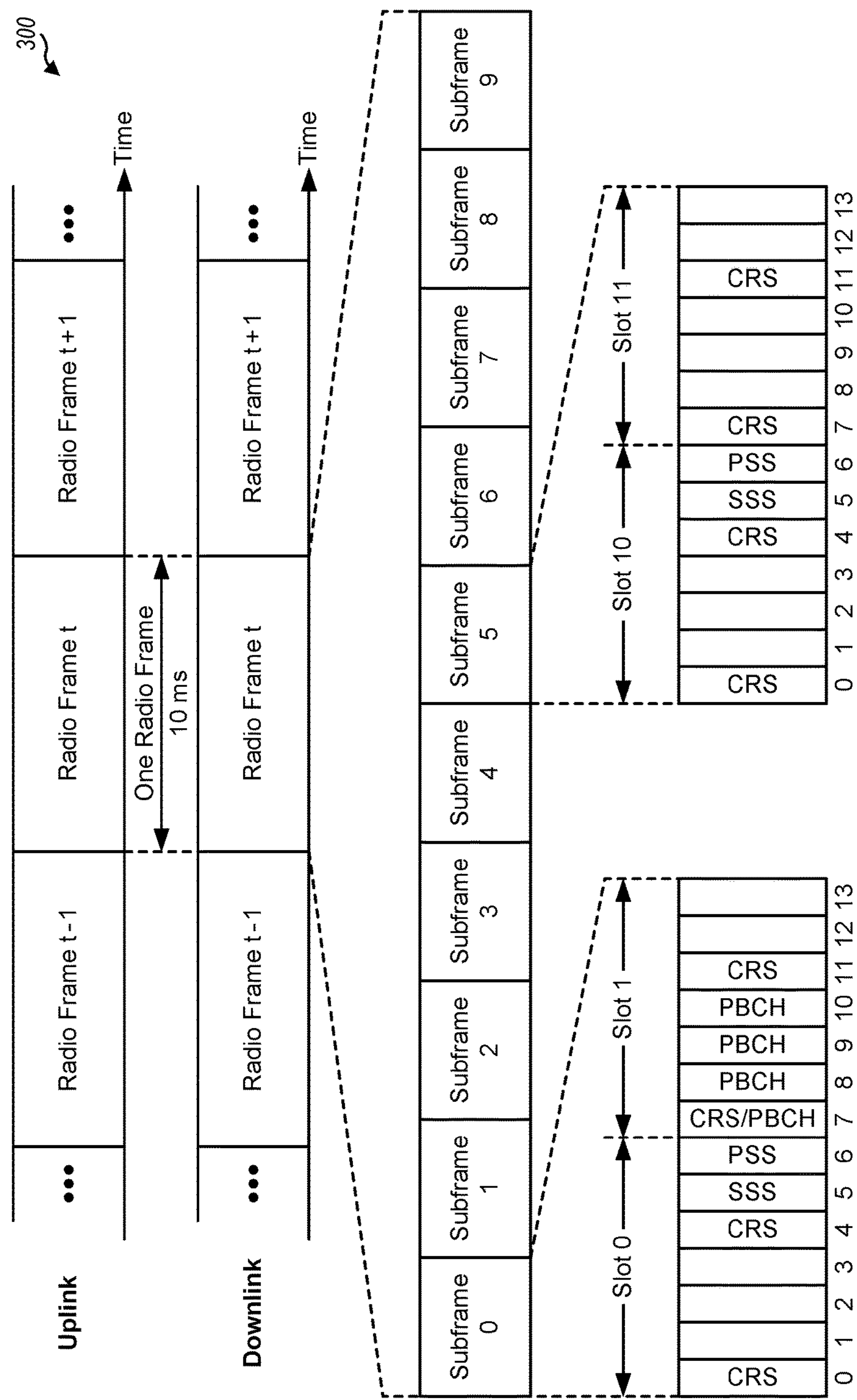
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
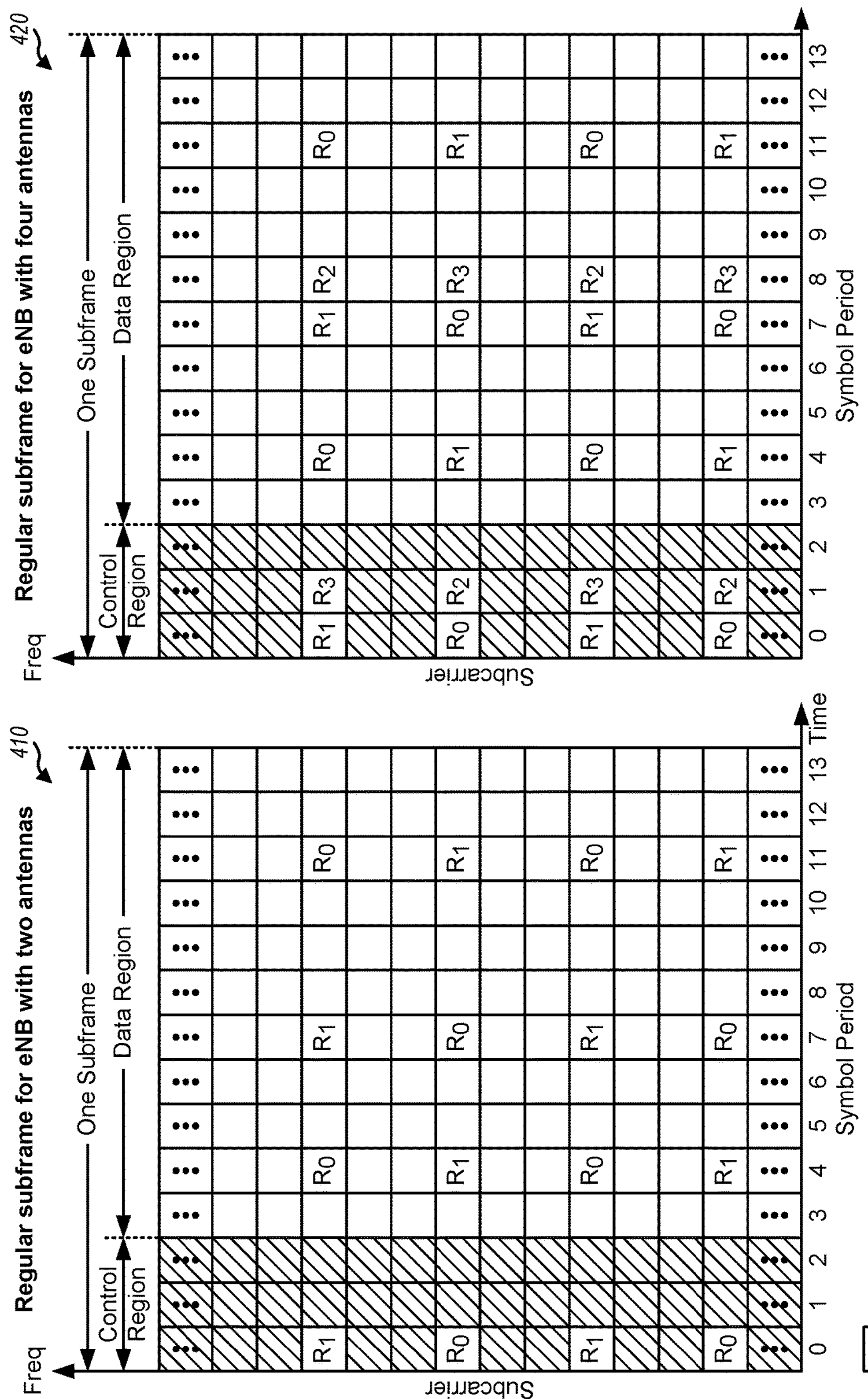
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example Narrowband Operation and Bundling in eMTC

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

As mentioned above, one or more UEs in the wireless communication network (e.g., wireless communication network 100) may be devices that have limited communication resources, such as low cost (LC) machine type communications (MTC) UEs, as compared to other (non-LC) devices in the wireless communication network.

Figure 5:
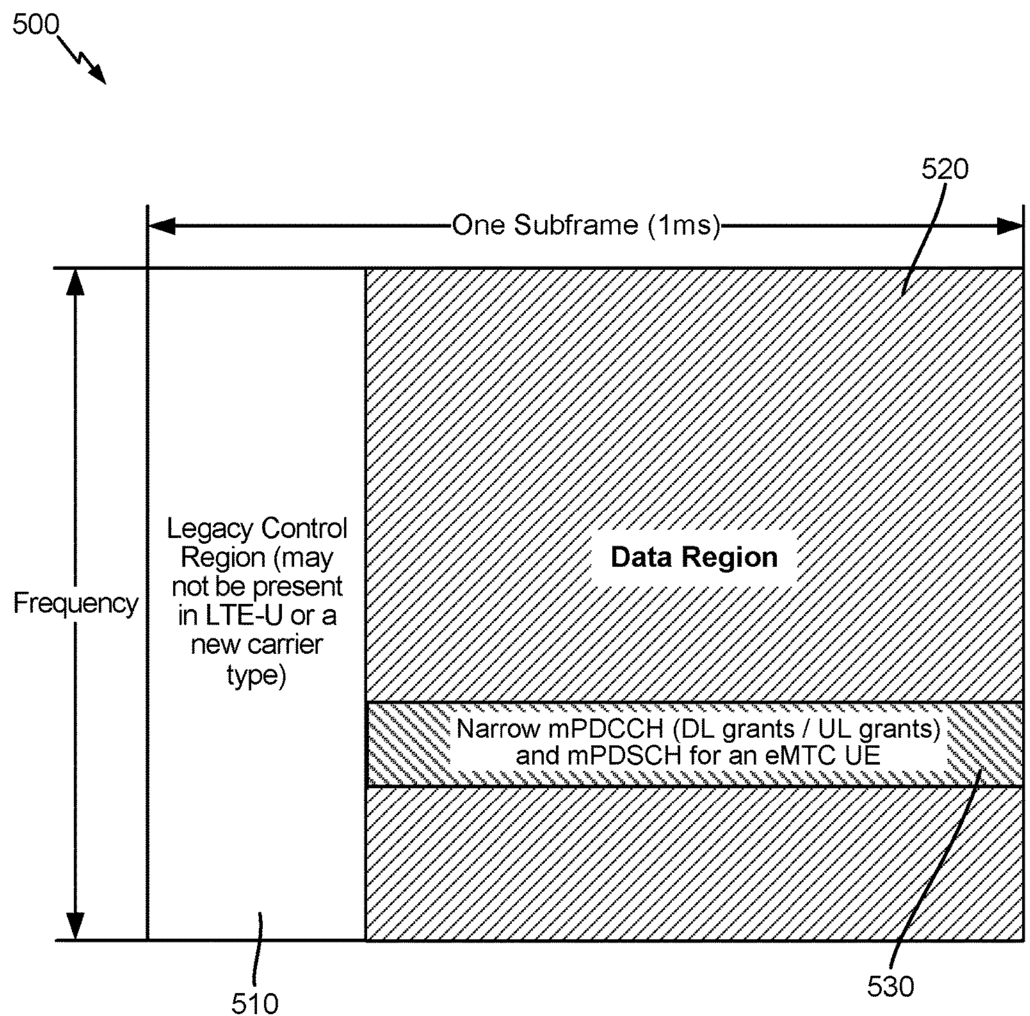
FIG. 5 illustrates an exemplary subframe configuration for narrowband communications, in accordance with certain aspects of the present disclosure.

In some systems, for example, in long term evolution (LTE) Release-13, eMTC may be supported for addition coverage enhancements (e.g., up to 15 dB). For example, as illustrated in the subframe structure 500 of FIG. 5, in eMTC, LC MTC UEs may be limited to narrowband assignment (e.g., of no more than six resource blocks (RBs) or 1.4 MHz), but may operate within a wider available system bandwidth (e.g., 1.4 MHz, 3 MHz, 5 MHz, 10 MHz, 15 MHz, or 20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

Thus, in eMTC, all signaling—broadcast (e.g., PBCH and SIB) and unicast (e.g., PDCCH, PDSCH, PUCCH, and PUSCH)—is narrowband. According to certain aspects, discussed in more detail below, LC MTC UEs may be able to re-tune (e.g., operate and/or camp) to different narrowband regions within the available system bandwidth of the LTE system, for example, in order to co-exist within the LTE system.

As another example of coexistence within the LTE system, LC UEs may use bundling (i.e., repetition) to receive/transmit legacy (or new non-legacy) transmissions (e.g., LTE unicast/broadcast channels). For unicast, bundling may be per-UE. However, for broadcast, bundling may always be for worst-case UE. For example, a bundling size for SIB1 may be 256 repetitions (256 ms).LC MTC UEs may also be a link budget limited device and may operate in different modes of operation (e.g. entailing different amounts of repeated messages transmitted to or from LC MTC UEs) based on its link budget limitation. For example, in some cases, LC MTC UEs may operate in a normal coverage mode in which there is little to no repetition (e.g., the amount of repetition needed for the UE to successfully receive and/or transmit a message may be low or repetition may not even be needed). Alternatively, in some cases, LC MTC UEs may operate in a coverage enhancement (CE) mode in which there may be high amounts of repetition. Some LC MTC UEs with low CE may use a smaller number of repetitions for successful decoding or transmission.

In some cases, (e.g., for LTE Rel-13), LC MTC UEs may have limited capabilities with respect to reception of broadcast and unicast transmissions. For example, the maximum transport block (TB) size for a broadcast transmission received by LC MTC UEs may be limited to 1000 bits. LC MTC UEs may use rank-1 transmissions (e.g., a single antenna). Additionally, in some cases, LC MTC UEs may not be able to receive more than one unicast or broadcast transmission in a subframe. Further, in some cases, the LC UE may not be able to receive both a unicast transmission and a broadcast transmission in a subframe. Narrowband operation with broadcast messages of large bundle size may lead to large overhead.

As mentioned above, in some cases, the LC MTC UEs may not be able to receive more than a single broadcast transmission at any given time. For example, for each subframe, LC MTC UEs may only be able be able to receive either a random access response (RAR) message, paging message, or broadcast signaling, etc., in the subframe. Further, although different broadcast transmissions may occur in different narrowband regions, the BS may not be able to simultaneously broadcast transmissions for each of the narrowband regions at the same time. Therefore, in some cases, there may be times where the LC MTC UE is expecting a particular broadcast transmission from the BS but the BS may not actually transmit the particular broadcast transmission.

Techniques are disclosed herein for simultaneous transmission/reception of unicast and broadcast signals and/or simultaneous transmission/reception of different broadcast signals in different narrowbands.

Example Simultaneous Narrowband Transmission/Reception in eMTC

According to certain aspects, broadcast signals may be transmitted simultaneously with other broadcast signals or with unicast signals using sets of narrowband resources in different narrowband regions for the different signals. Low cost (LC) machine type communications (MTC) user equipments (UE) may perform tuning and retuning between the different narrowband regions to receive the simultaneous transmissions.

Figure 6:
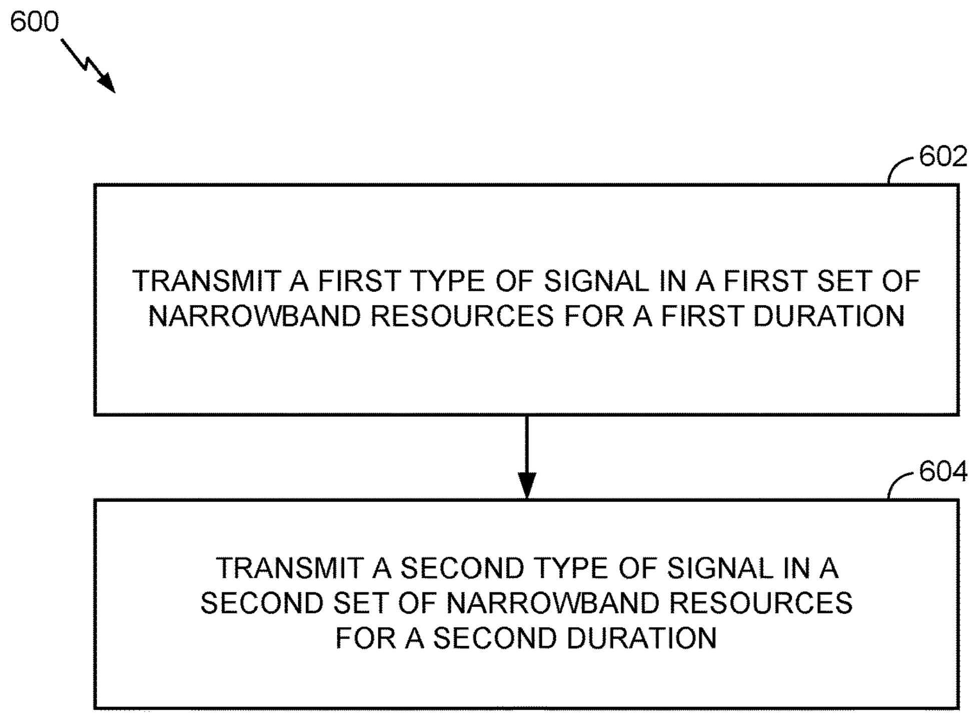
FIG. 6 illustrates example operations by a BS for simultaneous transmission on different narrowbands, in accordance with certain aspects of the present disclosure.

FIG. 6 illustrates example operations 600 for simultaneous transmissions in different narrowbands, in accordance with certain aspects of the present disclosure. The operations 600 may be performed, for example, by a base station (e.g., eNB 110). The operations 600 may begin, at 602, by transmitting a first type of signal (e.g., broadcast) in a first set of narrowband resources for a first duration. At 604, the BS transmits a second type of signal (e.g., broadcast or unicast) in a second set of narrowband resources for a second duration. The signals may be bundled transmissions and may be frequency hopped.

Figure 7:
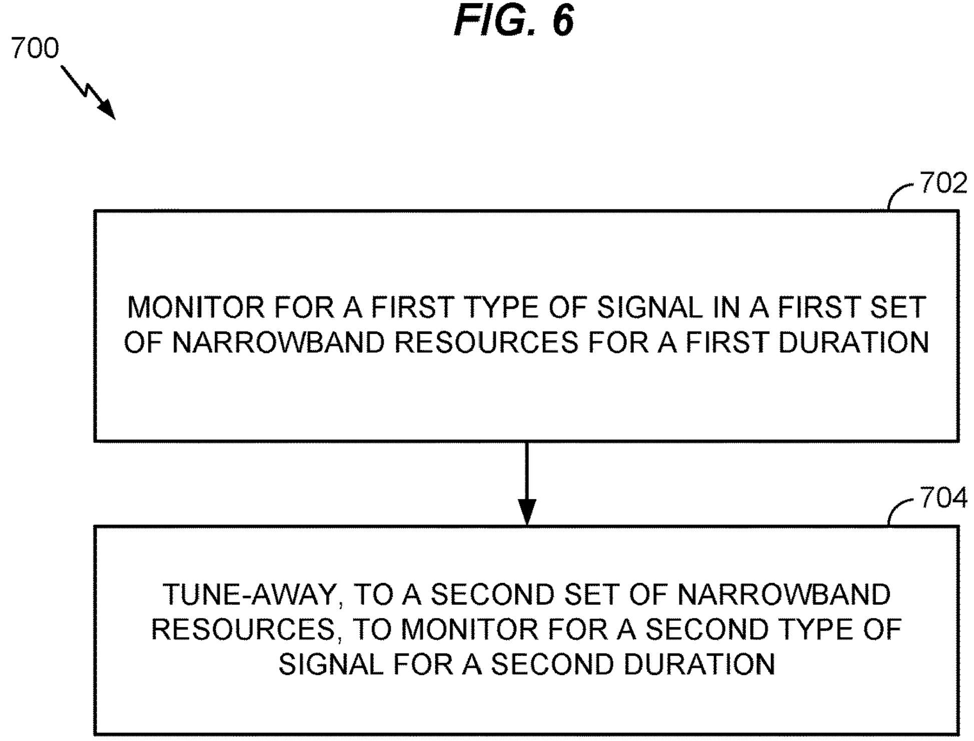
FIG. 7 illustrates example operations by a UE for simultaneous reception on different narrowbands, in accordance with certain aspects of the present disclosure.

FIG. 7 illustrates example operations 700 for reception of simultaneous transmissions in different narrowbands, in accordance with certain aspects of the present disclosure. The operations 700 may be performed, for example, by a user equipment (e.g., UE 120) which may be a LC MTC UE. The operations 700 may be complementary operations performed by the UE to the operations 600 performed by the BS. The operations 700 may begin, at 702, by monitoring for a first type of signal in a first set of narrowband resources for a first duration. At 704, the UE may tune-away, to a second set of narrowband resources, to monitor for a second type of signal for a second duration.

According to certain aspects, the e Node B (e.g., eNB 110) may provide the UE with a discontinuous reception (DRX) cycle for the UE for monitoring the different narrowband regions. Alternatively, the UE and eNB may agree upon a bundle size and/or when the UE will tune-away between narrowbands. The eNB may transmit according to the agreed schedule and the UE may tune-away and monitor according to the agreed schedule.

Example Simultaneous Broadcast-Unicast Signals

According to certain aspects, the first type of signals may broadcast signals (e.g., physical broadcast channel (PBCH) or system information block (SIB)) and the second type of signals may be unicast signals (e.g., physical downlink control channel (PDCCH), physical downlink shared channel (PDSCH), or random access response (RAR)). According to certain aspects, the UE may not need the entire bundle size for decoding the broadcast transmissions (e.g., SIB), thus, the UE can retune to a different narrowband to monitor a unicast channel (e.g., PDCCH) for potential unicast data.

Figure 8:
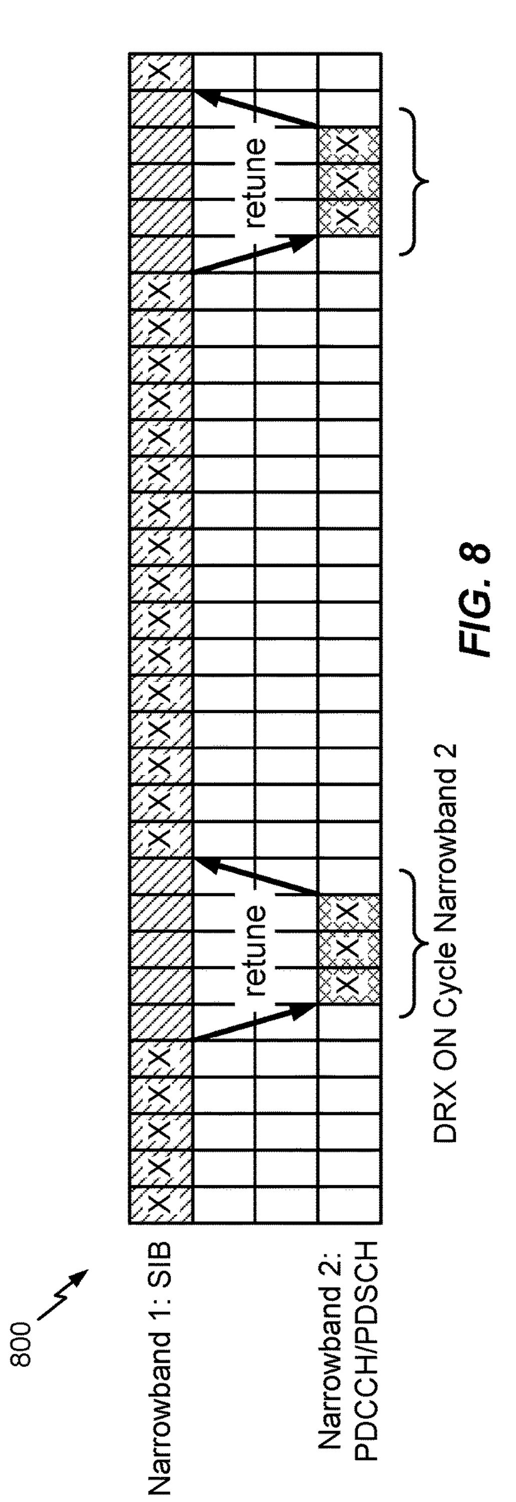
FIG. 8 illustrates an example time-frequency resource grid showing narrowband tune-away according to a discontinuous reception (DRX) cycle, in accordance with certain aspects of the present disclosure.

In one example implementation, the UE may tune-away may be based on a DRX cycle. FIG. 8 illustrates an example time-frequency resource grid 800 showing narrowband tune-away for simultaneous broadcast-unicast reception according to DRX cycle, in accordance with certain aspects of the present disclosure. As shown in FIG. 8, the UE may monitor for SIB in Narrowband 1 for a period and then may tune-away to Narrowband 2 to monitor for PDCCH and/or PDSCH during a DRX ON Cycle. As shown in the FIG. 8, the tune-away time may be longer than the DRX-ON Cycle duration since some time is needed to switch between the narrowbands (e.g., the time it may take to configure the radio frequency (RF) chain to monitor different resources).

According to certain aspects, the DRX cycle may be a function of a desired user application latency and/or a desired coverage for the user. DRX ON time may be a function of scheduling flexibility at the eNB and/or a bundling size used for unicast transmissions. As shown in FIG. 8, once the UE completes the DRX ON cycle or successfully decodes the unicast transmission, the UE may retune back to Narrowband 1 to monitor/decode broadcast transmissions, for example, until it tunes-away for the next DRX ON cycle. According to certain aspects, the UE may tune-away to Narrowband 2 once the UE decodes broadcast information on Narrowband 1.

In another example implementation, the UE tune-away may be agreed between the UE and the eNB. The eNB may know the repetitions (bundle size) for the UE to successfully decode and, thus, may know when the UE will tune-away. For example, the eNB and UE may agree on the bundling and/or tune-away (e.g., based on a desired coverage enhancement). The bundling size may change based on different modulation coding scheme (MCS) and/or aggregation levels (e.g., if SIB is 1000 bits, retuning time may be 100 subframes, but if SIB is 256 bits, retuning time may be 16 subframes). Since the eNB knows the retune time from coverage enhancement mode or signaling from the UE, the eNB may not need to signal DRX cycles to the UE.

Figure 9:
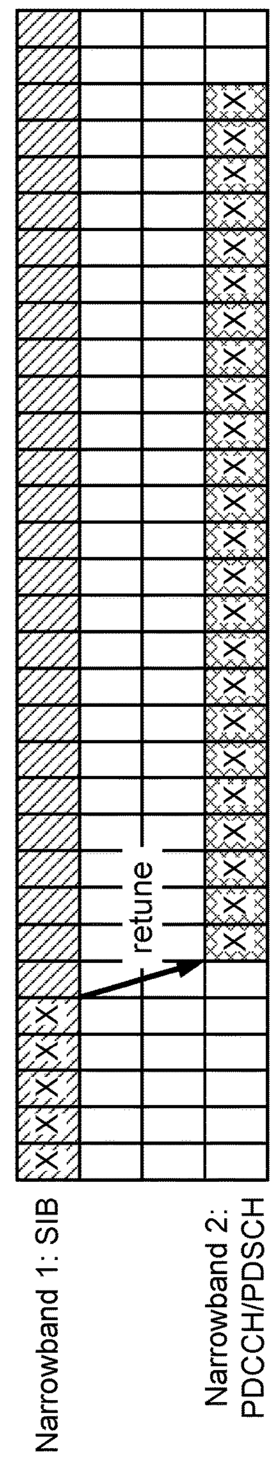
FIG. 9 illustrates an example time-frequency resource grid showing narrowband tune-away according to an agreement between the UE and eNB, in accordance with certain aspects of the present disclosure.
Figure 10:
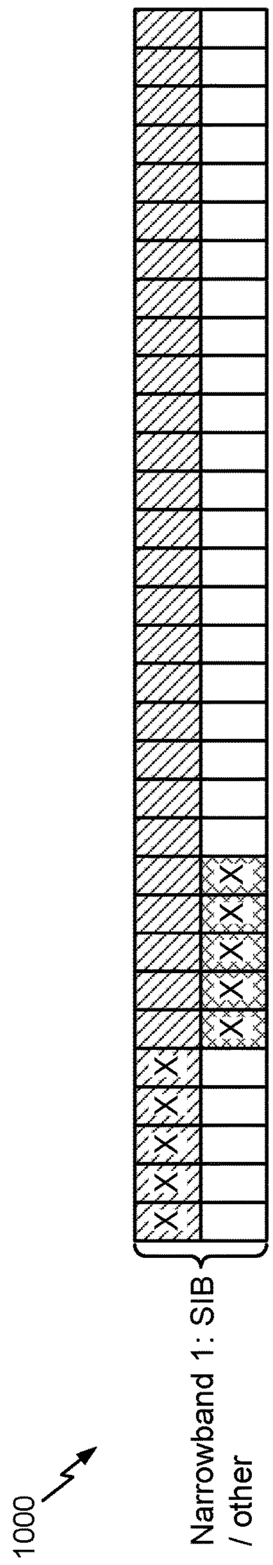
FIG. 10 illustrates an example time-frequency resource grid showing tune-away to a different portion of the same narrowband according to an agreement between the UE and eNB, in accordance with certain aspects of the present disclosure.

FIG. 9 illustrates an example time-frequency resource grid 900 showing narrowband tune-away for simultaneous broadcast-unicast reception according to an agreement between the UE and eNB, in accordance with certain aspects of the present disclosure. For example, the eNB may know the bundling size for the UE to decode PDSCH. SIB1 may have a bundling size of 1000 repetitions, however, the UE may only use N (e.g., 20) repetitions to successfully decode SIB1. Thus, after N resource blocks are received, the UE may retune to monitor Narrowband 2. Further, as shown in FIG. 9, the eNB may begin transmitting unicast on Narrowband 2 at the time the eNB knows the UE will tune-away (and may take into account the switching time). Alternatively, after the N resource blocks are received by the UE, the eNB may transmit and the UE may monitor for unicast transmissions in a different portion (e.g., different resource elements (REs)) of the same narrowband (Narrowband 1) as shown in FIG. 10. In this case, no retuning time may be needed for the UE to monitor for the unicast transmissions.

According to certain aspects, the UE may be assigned an anchor narrowband control region and/or a narrowband-hopped control region. If the UE has an assigned anchor narrowband, then after the UE monitors for a broadcast signal, the UE may tune-away to the anchor narrowband control region. After frequency hopped transmission reception, the UE may tune-away to the anchor narrowband-hopped control region.

Example Subband Dependent DRX

Figure 11:
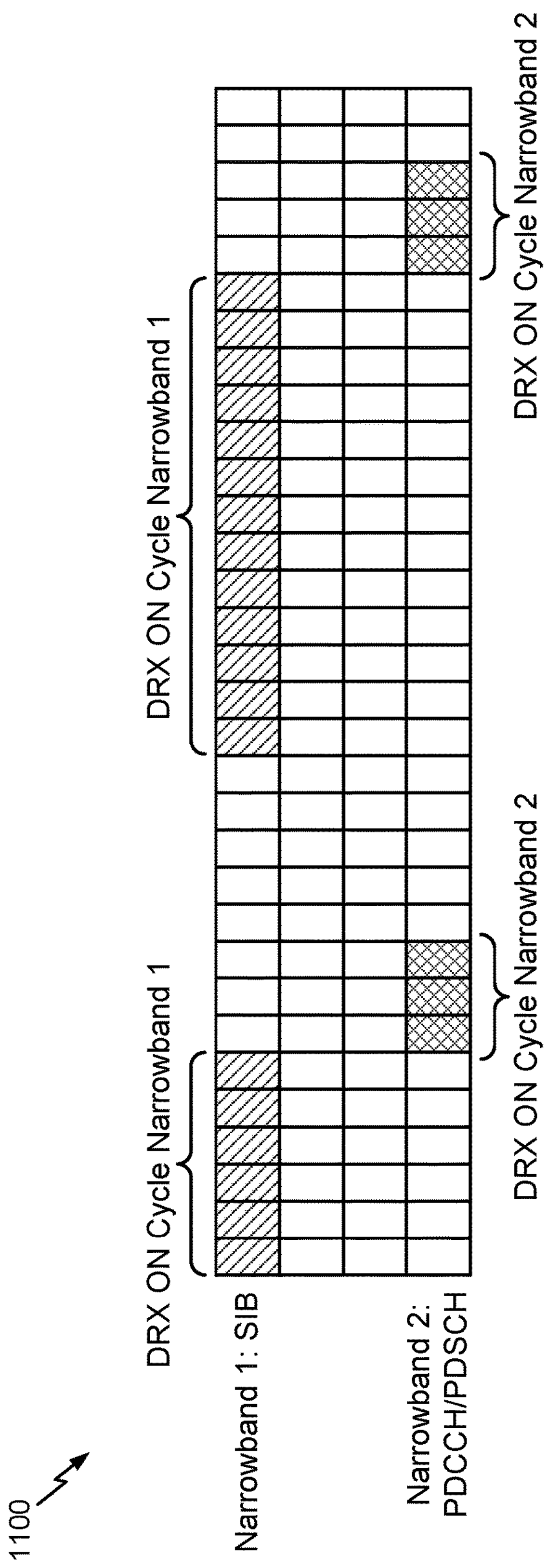
FIG. 11 illustrates an example time-frequency resource grid showing non-overlapping DRX ON cycles for different narrowbands, in accordance with certain aspects of the present disclosure.

According to certain aspects, the DRX cycle may be subband dependent. For example, in some narrowband regions the UE may continuously monitor the DL signal (e.g., for a bundled SIB); however, as mentioned above, in some other narrowband region, the UE may monitor unicast according to a DRX cycle. According to certain aspects, the DRX cycle may be disjointed for different subbands. As shown in FIG. 11, the UE may monitor for SIB during a first DRX ON cycle for Narrowband 1. The UE may then tune-away to monitor for a unicast during a DRX ON cycle for Narrowband 2. As shown in FIG. 11, the DRX ON cycle for Narrowband 1 may be longer than the DRX ON cycle for Narrowband 2.

Figure 12:
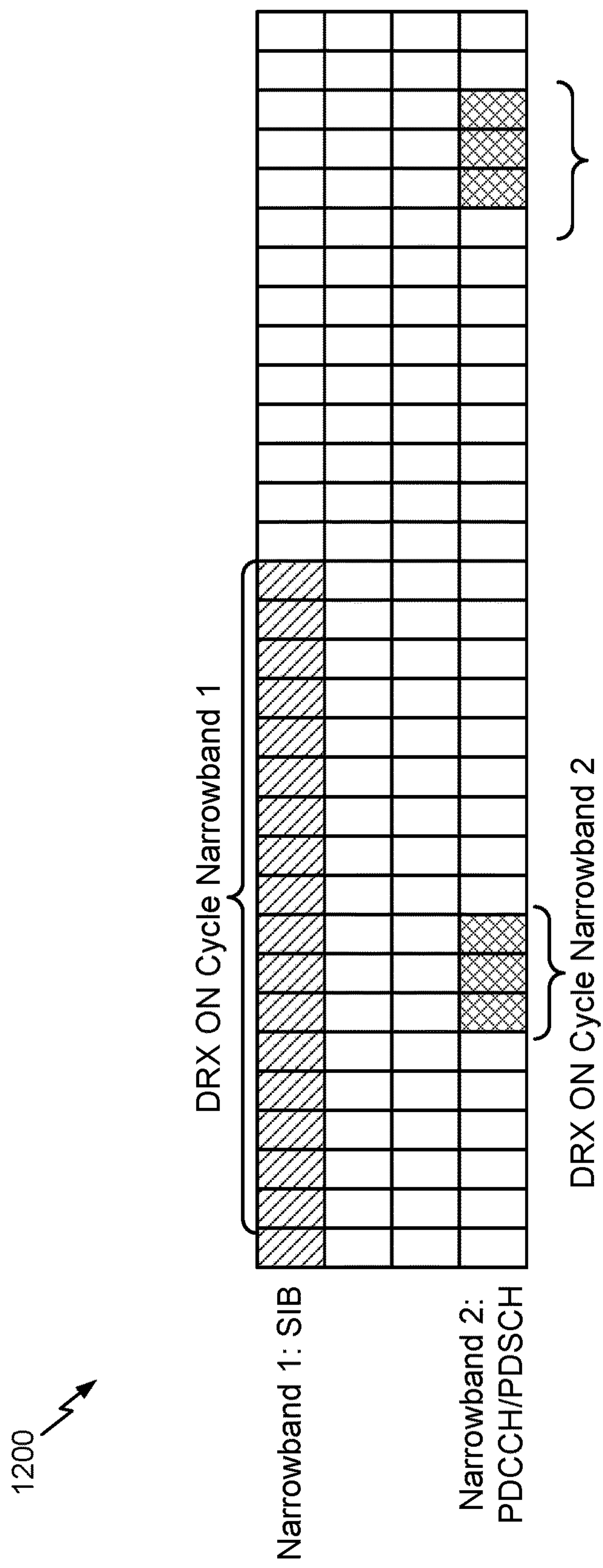
FIG. 12 illustrates an example time-frequency resource grid showing overlapping DRX ON cycles for different narrowbands, in accordance with certain aspects of the present disclosure.

As shown in FIG. 11, the DRX ON cycles for Narrowband 1 and Narrowband 2 do not overlap (i.e., are disjointed). Alternatively, the DRX ON cycles may be overlapping or partial overlapping (not shown in FIG. 11). For example, as shown in FIG. 12, the DRX ON cycle for Narrowband 2 partially overlap the DRX ON cycle for Narrowband 1.

Example Simultaneous Broadcast-Broadcast Signals

Figure 13:
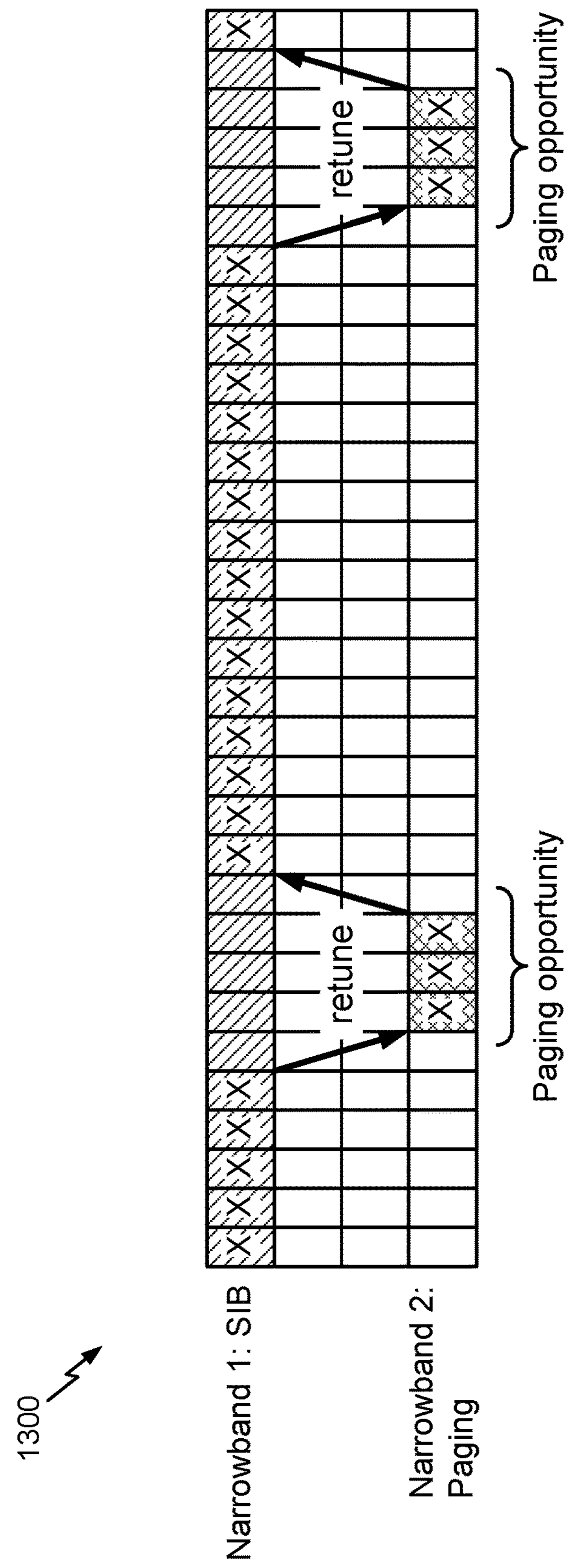
FIG. 13 illustrates an example time-frequency resource grid showing narrowband tune-away during a paging opportunity, in accordance with certain aspects of the present disclosure.

According to certain aspects, the first type of signal and the second type of signal may be different broadcast signals. In an example implementation, the eNB may broadcast signals (e.g., SIB) in the first set of narrowband resources and may provide paging in the second set of narrowband resources. The UE may monitor for broadcast signals in the first set of narrowband resources and may tune-away to monitor the second set of narrowband resources whenever there is a paging opportunity as shown in FIG. 13. After the paging occasion, the UE may tune back to monitor for the other broadcast signal (e.g., SIB) in the first set of narrowband resources.

In another example implementation, the eNB may broadcast signals (e.g., SIB) in the first set of narrowband resources and a random access procedure (RACH) may be performed using different set(s) of narrowband resources. If there is collision of a random access response (RAR) with other broadcast signals, the UE may perform RACH in a different narrowband and monitor RAR as a priority instead of monitoring SIB in the other narrowband.

Figure 14:
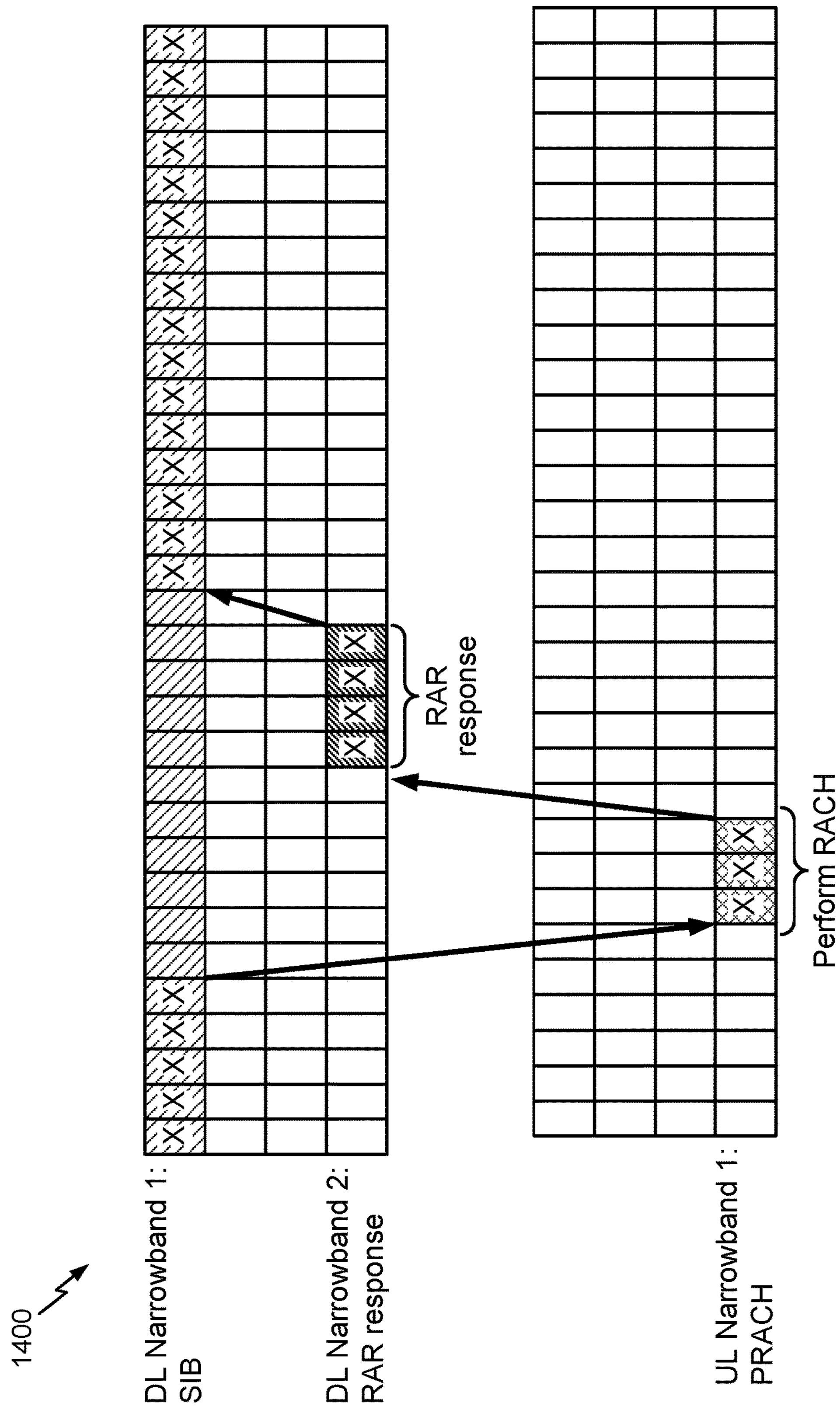
FIGS. 14-14A illustrate example time-frequency resource grids showing narrowband tune-away for performing a random access channel (RACH) procedure, in accordance with certain aspects of the present disclosure.
Figure 14A:
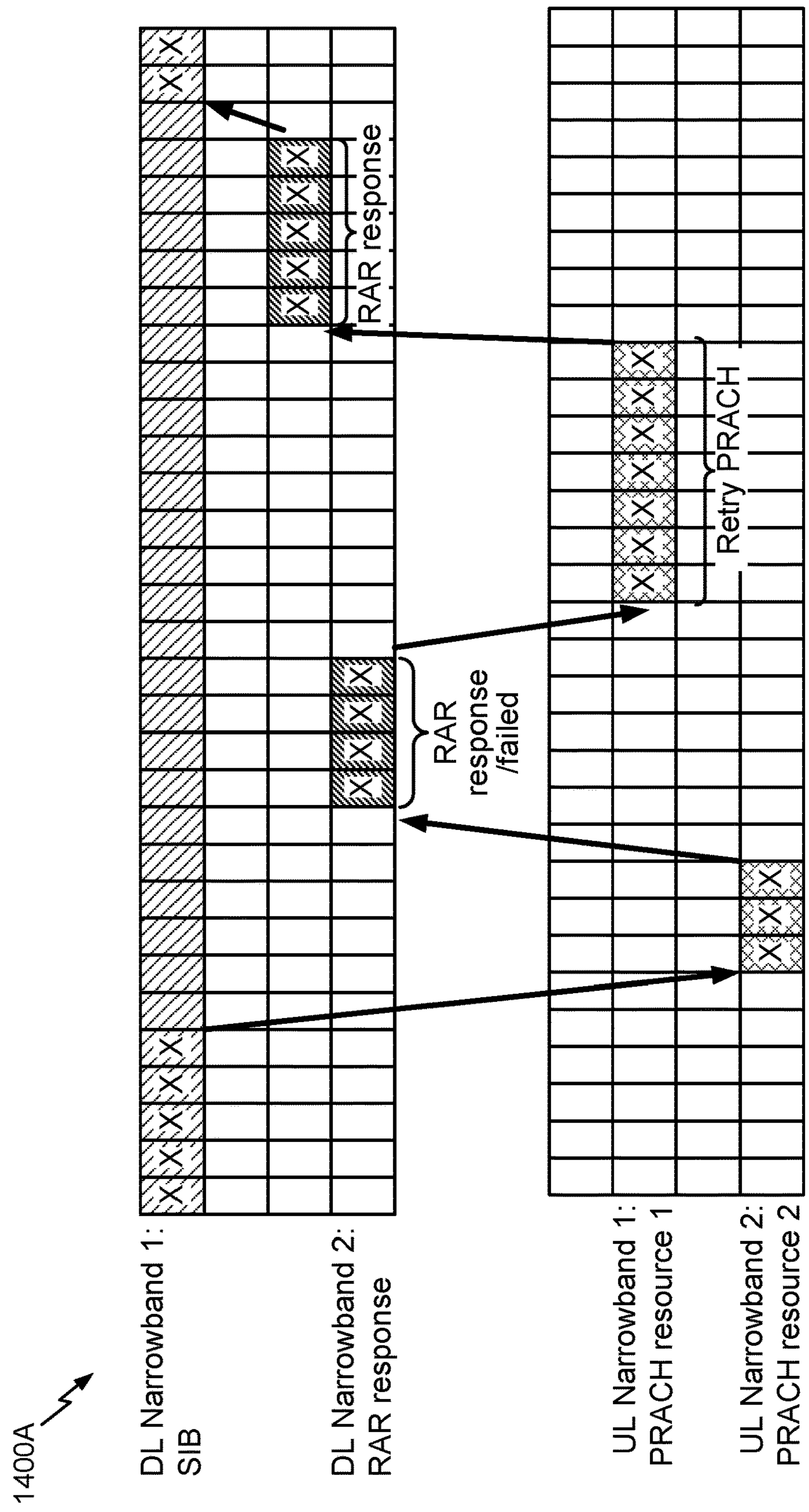

FIGS. 14-14A illustrate example time-frequency resource grids 1400 and 1400A showing narrowband tune-away for performing a random access channel (RACH) procedure, in accordance with certain aspects of the present disclosure. According to certain aspects, the random access procedure in MTC and/or eMTC may also use narrowband operation and different amounts of bundling for the different messages used in the random access procedure. For example, the RACH procedure may include a bundled RACH preamble (e.g., MTC_MSG 1), a bundled random access response (RAR) message (e.g., MTC_MSG 2), a bundled connection request message (e.g., MTC_MSG 3), and/or a bundled contention resolution message e.g., (MTC_MSG 4). As shown in FIG. 14, the UE may monitor for SIB on DL Narrowband 1. The UE may tune-away to UL Narrowband 1 to perform a RACH procedure, for example, to transmit PRACH. Then the UE may tune-away to DL Narrowband 2 to monitor for RAR. After performing the RACH, the UE may tune back to DL Narrowband 1 to continue monitoring for broadcast. As shown in FIG. 14A, if the RAR response indicates a failure, the UE may tune-away to a different UL Narrowband region to retry the PRACH and then tune-away to a different portion of DL Narrowband 1 to monitor for the RAR response.

Example Subframe Combining

Figures 15, 16:
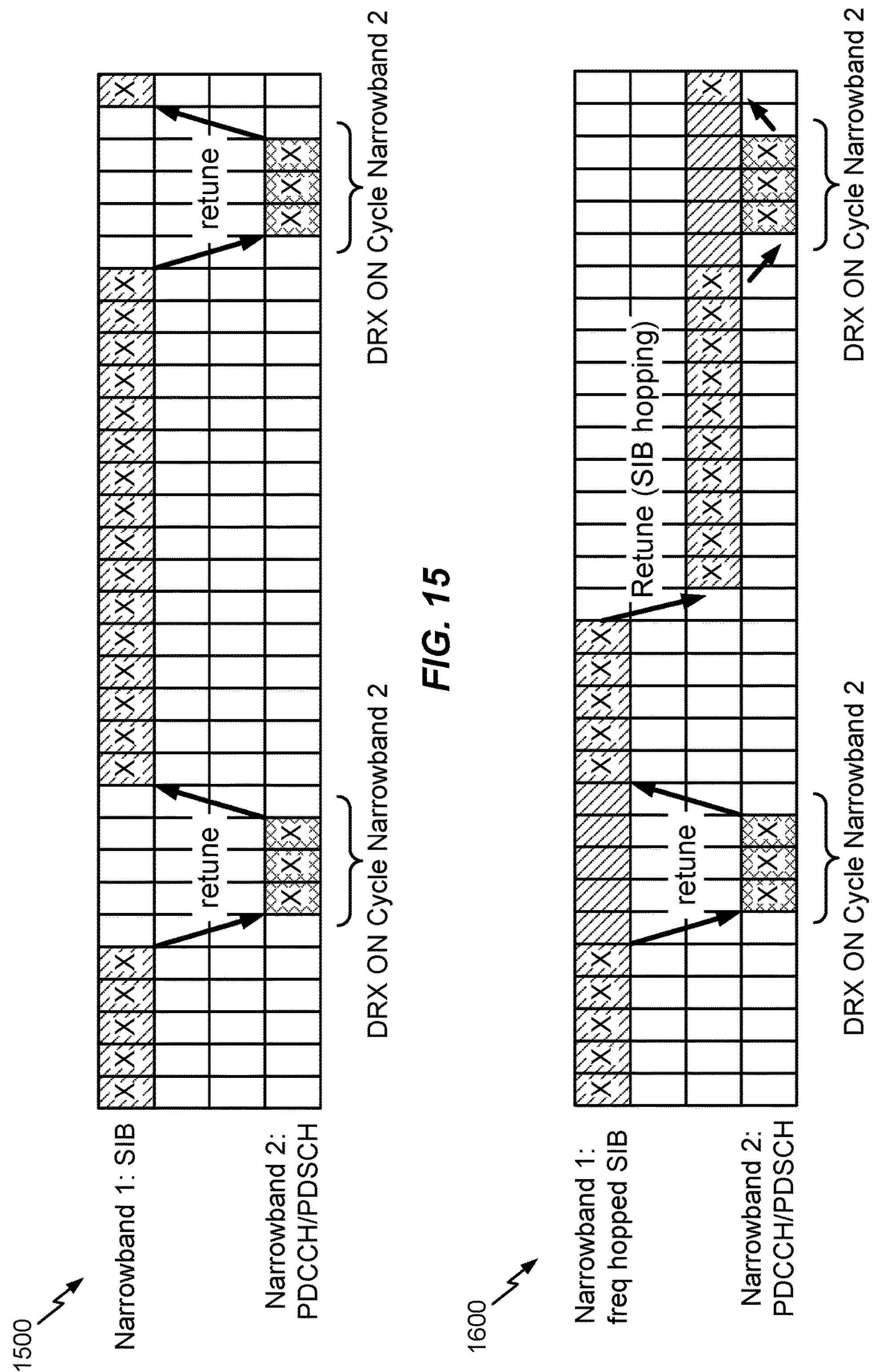
FIG. 15 illustrates an example time-frequency resource grid showing narrowband tune-away with subframe combining, in accordance with certain aspects of the present disclosure.
FIG. 16 illustrates an example time-frequency resource grid showing narrowband tune-away according to a DRX cycle and frequency hopping, in accordance with certain aspects of the present disclosure.

According to certain aspects, some broadcast (e.g., bundled SIB) may be combined with disjoint subframes due to tune-away. Redundancy version (RV) change may be taken into account. Subframe combining may also account for switching time as well as the unicast monitoring time. As shown in FIG. 15, the UE may monitor SIB on Narrowband 1 and then retune to monitor unicast on Narrowband 2, for example based on DRX ON cycle. Subframe combining may take in account both the monitoring during the DRX ON cycle on Narrowband 2 as well as the switching time between Narrowband 1 and Narrowband 2 and retuning back time.

Example Narrowband Tuning with Frequency Hopping

According to certain aspects, the sets of narrowband resources (e.g., Narrowband 1, Narrowband 2) may include a plurality of narrowband regions. Thus, when the UE tunes back to the first set of narrowband resources (Narrowband 1), the UE may tune back to a different narrowband region, for example, based on frequency hopping as discussed in more detail below. According to certain aspects, additional retuning may be performed based on if the channels are frequency hopped. FIG. 16 illustrates an example time-frequency resource grid 1600 showing narrowband tune-away according to a DRX cycle and frequency hopping, in accordance with certain aspects of the present disclosure. For example, as shown in FIG. 16, the UE may monitor a frequency hopped SIB on Narrowband 1. In this case, for example, after the UE tunes-away to monitor unicast on Narrowband 2 according to the DRX ON cycle and retunes to Narrowband 1, the UE may retune to a different portion of Narrowband 1 (e.g., different subbands or REs within Narrowband 1) to continue monitoring for the SIB. In this case, after the next time the UE tunes-away to Narrowband 2, the UE will retune to different portion of Narrowband 1, as shown in FIG. 16.

Example Narrowband Tuning after Early Decoding

According to certain aspects, UE retuning may change if a message is quickly decoded. For example, PDCCH may be decoded in the third subframe with bundle size 10. In this case, the UE may retune early to monitor a different subband. Alternatively, the UE may enter a low power consumption mode (e.g., sleep) once everything has been decoded.

Figure 17:
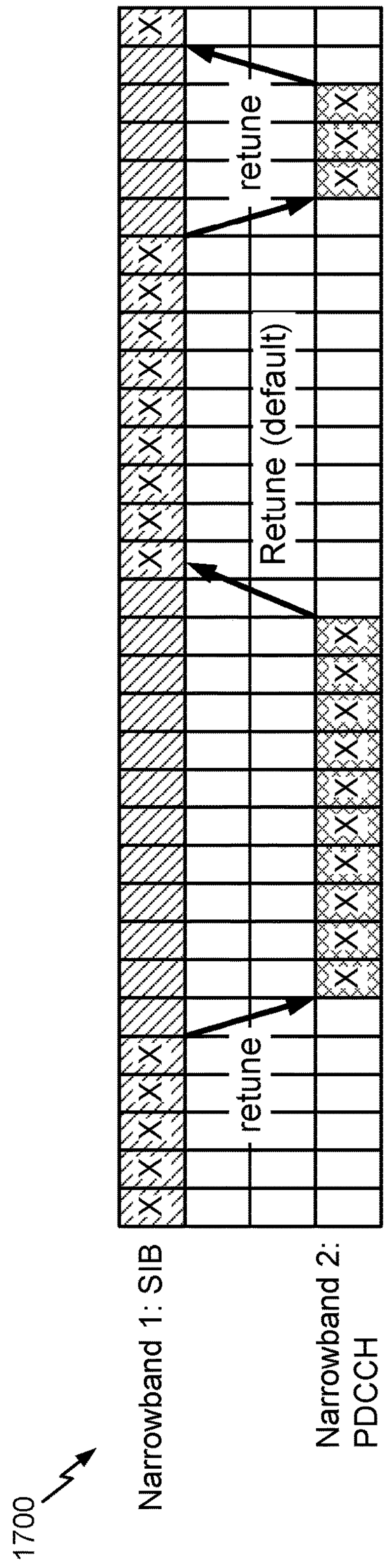
FIGS. 17-17B illustrate example time-frequency resource grids showing narrowband tune-away after early decoding, in accordance with certain aspects of the present disclosure.
Figure 17A:
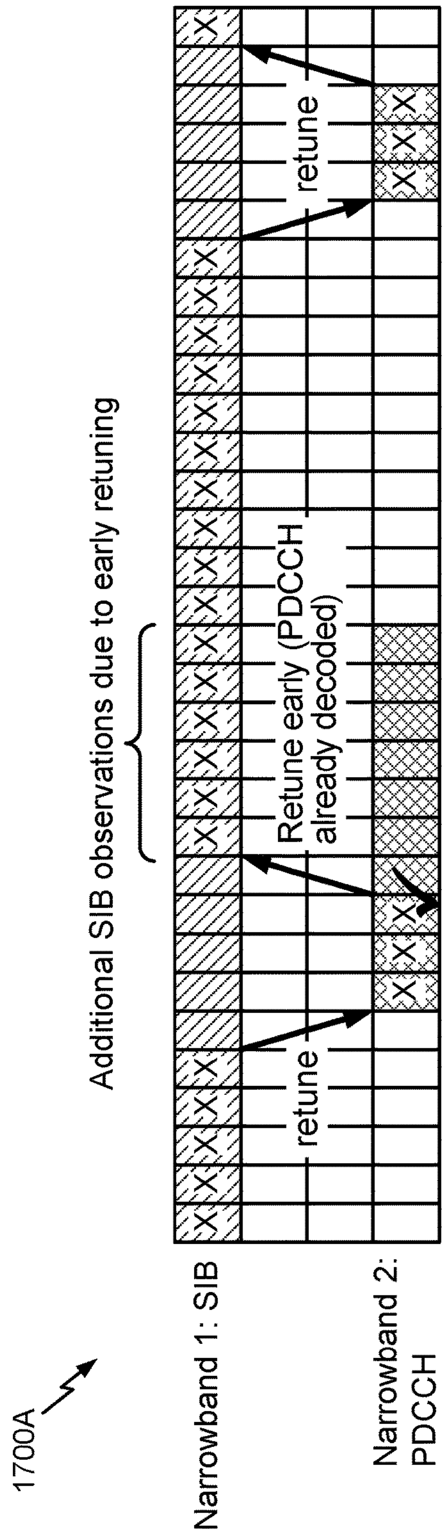
Figure 17B:
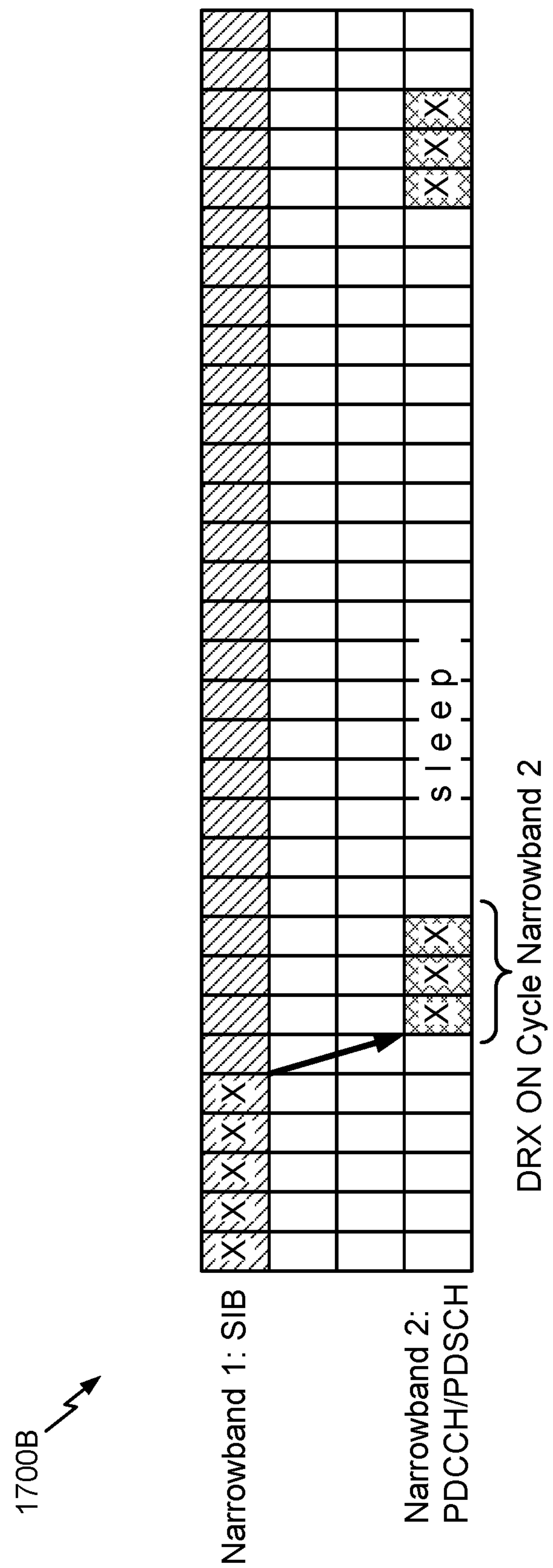

FIGS. 17-17B illustrate example time-frequency resource grids 1700, 1700A, and 1700B, respectively, showing narrowband tune-away after early decoding, in accordance with certain aspects of the present disclosure. FIG. 17 illustrates an example default retune behavior for the UE. As shown in FIG. 17A, the UE may decode PDCCH earlier than the default tune-away period, thus, the UE may retune back to Narrowband 1 early to monitor for SIB. Alternatively, as shown in FIG. 17B, if the UE has already decode broadcast and unicast signals, the UE may sleep.

According to certain aspects, the techniques described herein for simultaneous narrowband transmission/reception may be applicable to narrowband internet-of-things (NB-IoT).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving and means for monitoring may comprise a receiver which may include demodulator(s) 254*a*-254*r*, MIMO Detector 256, Receive Processor 258, and/or an antenna(s) 252*a*-254*r* of the user terminal 120 illustrated in FIG. 2 or the demodulator(s) 232*a*-232*r*, MIMO Detector 236, Receive Processor 238, and/or antenna(s) 234*a*-234*r* of access point 110 illustrated in FIG. 2.

Means for transmitting may be a transmitter which may include modulator(s) 254*a*-254*r*, TX MIMO Processor 256, Transmit Processor 264, and/or an antenna(s) 252*a*-252*r* of the user terminal 120 illustrated in FIG. 2 or modulator(s) 232*a*-232*r*, TX MIMO Processor 230, Transmit Processor 220, and/or antenna(s) 234*a*-234*r* of access point 110 illustrated in FIG. 2.

Means for processing, means for decoding, and/or means for monitoring, may comprise a processing system, which may include one or more processors, such as the MIMO Detector 256, Receive Processor 258, and/or the Controller/Processor 280 of the user terminal illustrated in FIG. 2 or the Controller/Processor 240 of the access terminal 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for monitoring for a first type of signal in a first set of narrowband resources for a first duration and an algorithm for tuning-away, to a second set of narrowband resources, to monitor for a second type of signal for a second duration.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for monitoring for a first type of signal in a first set of narrowband resources for a first duration and instructions for tuning-away, to a second set of narrowband resources, to monitor for a second type of signal for a second duration.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:

transmitting a first broadcast signal to a user equipment (UE) in a first set of narrowband resources for a first duration;

transmitting a unicast transmission to the UE in a second set of narrowband resources, different than the first set of narrowband resources, for a second duration, wherein at least a portion of the first duration and the second duration overlap; and providing the UE with a first discontinuous reception (DRX) cycle based on a bundling size of the unicast transmission to tune-away from the first set of narrowband resources to the second set of narrowband resources.

2. The method of claim 1, wherein at least one of the first broadcast signal or the unicast transmission comprises a bundled transmission.

3. The method of claim 1, wherein at least one of the first broadcast signal or the unicast transmission comprises a frequency hopped transmission.

4. The method of claim 1, wherein:

the first broadcast signal comprises at least one of a physical broadcast channel (PBCH) transmission, a system information block (SIB) transmission, a paging transmission, or a random access response (RAR) transmission; and the unicast transmission comprises a physical downlink control channel (PDCCH) transmission or a physical downlink shared channel (PDSCH) transmission.

5. The method of claim 4, wherein:

the paging transmission comprises a RAR message; and the method further comprises receiving an uplink random access channel (RACH) message from the UE in a third set of narrowband resources for a third duration.

6. The method of claim 1, wherein at least one of the first duration or the second duration comprises a duration agreed upon between the UE and the BS.

7. The method of claim 6, wherein the agreed upon duration is based on a bundling size of at least one of the first broadcast signal or the unicast transmission.

8. The method of claim 1, wherein the first duration is based on a second DRX cycle.

9. The method of claim 8, wherein the first DRX cycle does not overlap the second DRX cycle.

10. The method of claim 8, wherein the first DRX cycle at least partially overlaps the second DRX cycle.

11. The method of claim 1, wherein the first duration includes the second duration.

12. A method for wireless communications by a user equipment (UE), comprising:

monitoring for a first broadcast signal from a base station (BS) in a first set of narrowband resources for a first duration; and tuning-away during a first discontinuous reception (DRX) cycle, to a second set of narrowband resources, different than the first set of narrowband resources, to monitor for a unicast transmission from the BS for a second duration, wherein the first DRX cycle is based on a bundling size of the unicast transmission.

13. The method of claim 12, wherein:

the first broadcast signal comprises at least one of a physical broadcast channel (PBCH) transmission, a system information block (SIB) transmission, a paging transmission, or a random access response (RAR) transmission; and the unicast transmission comprises a physical downlink control channel (PDCCH) transmission or a physical downlink shared channel (PDSCH) transmission.

14. The method of claim 13, wherein:

the paging transmission comprises a RAR message; and the method further comprises transmitting an uplink random access channel (RACH) message to the BS in a third set of narrowband resources for a third duration.

15. The method of claim 12, wherein at least one of the first duration or the second duration comprises a duration agreed upon between the UE and the BS.

16. The method of claim 15, wherein the agreed upon duration is based on a bundling size of at least one of the first broadcast signal or the unicast transmission.

17. The method of claim 12, wherein the first duration is based on a second DRX.

18. The method of claim 17, wherein the first DRX cycle does not overlap the second DRX cycle.

19. The method of claim 17, wherein the first DRX cycle at least partially overlaps the second DRX cycle.

20. The method of claim 12, wherein:

the first set of narrowband resources and the second set of narrowband resources comprise a plurality of narrowband regions; and the monitoring comprises monitoring a narrowband in the first or second set of narrowband resources based on a frequency hopping.

21. The method of claim 20, further comprising re-tuning to a different narrowband region of the first or second set of narrowband resources to monitor for the first broadcast signal or the unicast transmission.

22. The method of claim 12, wherein:

the first duration comprises a duration until the first broadcast signal is successfully decoded; and the second duration comprises a duration until the unicast transmission is successfully decoded.

23. The method of claim 12, further comprising:

decoding the first broadcast signal on a first portion of the first set of narrowband resources, and monitoring a second portion of the first set of narrowband resources for the unicast transmission once the first broadcast signal is successfully decoded.

24. The method of claim 12, further comprising:

tuning-away to a fourth set of narrowband resources to monitor for the first broadcast signal, a second broadcast signal, or the unicast transmission for a fourth duration.

25. An apparatus for wireless communications by a base station (BS), comprising:

at least one processor configured to cause the apparatus to:

transmit a first broadcast signal to a user equipment (UE) in a first set of narrowband resources for a first duration; and transmit a unicast transmission to the UE in a second set of narrowband resources, different than the first set of narrowband resources, for a second duration, wherein at least a portion of the first duration and the second duration overlap; and provide the UE with a first discontinuous reception (DRX) cycle based on a bundling size of the unicast transmission to tune-away from the first set of narrowband resources to the second set of narrowband resources; and a memory coupled with the at least one processor.

26. An apparatus for wireless communications by a user equipment (UE), comprising:

at least one processor configured to cause the apparatus to:

monitor for a first broadcast signal from a base station (BS) in a first set of narrowband resources for a first duration; and tune-away during a first discontinuous reception (DRX) cycle, to a second set of narrowband resources, different than the first set of narrowband resources, to monitor for a unicast transmission from the BS for a second duration, wherein the first DRX cycle is based on a bundling size of the unicast transmission; and a memory coupled with the at least one processor.

* * * * *